United States Patent
Prasad et al.

(10) Patent No.: US 8,805,094 B2
(45) Date of Patent: Aug. 12, 2014

(54) USING MACHINE LEARNING TO IMPROVE DETECTION OF VISUAL PAIRWISE DIFFERENCES BETWEEN BROWSERS

(75) Inventors: Mukul R. Prasad, San Jose, CA (US); Shauvik Roy Choudhary, Atlanta, GA (US)

(73) Assignee: Fujitsu Limited, Kawasaki-shi (JP)

( * ) Notice: Subject to any disclaimer, the term of this patent is extended or adjusted under 35 U.S.C. 154(b) by 0 days.

(21) Appl. No.: 13/248,030

(22) Filed: Sep. 29, 2011

(65) Prior Publication Data

US 2013/0083996 A1    Apr. 4, 2013

(51) Int. Cl.
*G06K 9/68* (2006.01)

(52) U.S. Cl.
USPC ........... 382/226; 382/159; 382/224; 382/225; 382/294

(58) Field of Classification Search
USPC .................................. 382/159, 224–226, 294
See application file for complete search history.

(56) References Cited

U.S. PATENT DOCUMENTS

| | | | | |
|---|---|---|---|---|
| 6,272,479 | B1 * | 8/2001 | Farry et al. ....................... | 706/13 |
| 6,918,066 | B2 * | 7/2005 | Dutta et al. ...................... | 714/46 |
| 7,240,050 | B2 * | 7/2007 | Zhou et al. ...................... | 345/418 |
| 7,693,348 | B2 * | 4/2010 | Zavadsky et al. ............. | 382/294 |
| 7,773,813 | B2 * | 8/2010 | Hua et al. ....................... | 382/224 |
| 8,064,697 | B2 * | 11/2011 | Zhao et al. ..................... | 382/181 |
| 8,165,997 | B1 * | 4/2012 | Podgorny et al. ............. | 707/688 |
| 8,180,112 | B2 * | 5/2012 | Kurtz et al. ................... | 382/108 |
| 8,265,351 | B2 * | 9/2012 | Aarabi .......................... | 382/118 |
| 8,620,038 | B2 * | 12/2013 | Aarabi .......................... | 382/118 |
| 8,660,319 | B2 * | 2/2014 | Aarabi .......................... | 382/118 |
| 2006/0257051 | A1 * | 11/2006 | Zavadsky et al. ............. | 382/294 |
| 2007/0031063 | A1 * | 2/2007 | Zhou .............................. | 382/284 |
| 2007/0086659 | A1 * | 4/2007 | Chefd'hotel et al. .......... | 382/225 |
| 2008/0077855 | A1 * | 3/2008 | Lev et al. ...................... | 715/236 |
| 2008/0123996 | A1 * | 5/2008 | Zavadsky et al. ............. | 382/294 |
| 2008/0133510 | A1 * | 6/2008 | Timmons .......................... | 707/5 |
| 2008/0267443 | A1 * | 10/2008 | Aarabi .......................... | 382/100 |
| 2009/0249216 | A1 * | 10/2009 | Charka et al. ................. | 715/744 |
| 2009/0265290 | A1 * | 10/2009 | Ciaramita et al. .............. | 706/12 |
| 2010/0211893 | A1 * | 8/2010 | Fanning et al. ............... | 715/760 |
| 2010/0245563 | A1 * | 9/2010 | Golovchinsky et al. ...... | 348/135 |
| 2010/0257167 | A1 * | 10/2010 | Liu ............................... | 707/731 |
| 2011/0029517 | A1 * | 2/2011 | Ji et al. ......................... | 707/734 |

(Continued)

OTHER PUBLICATIONS

U.S. Appl. No. 12/723,568, filed Mar. 12, 2010, Prasad et al.

(Continued)

*Primary Examiner* — Jayesh A Patel
(74) *Attorney, Agent, or Firm* — Baker Botts L.L.P.

(57) ABSTRACT

In some embodiments, information associated with a first plurality of image pairs is received. Each image pair is assessed to detect visual pairwise differences that qualify as an error. A visual pairwise difference may be a difference with respect to at least one of position, size, color, or style. A prediction engine is trained based upon the assessed visual pairwise differences. Information associated with a second plurality of image pairs is received. Each of these image pairs comprises at least a portion of a visual end-user experience screen of an event-driven application executed in a client-tier environment. Each of these image pairs is assessed, using the prediction engine, to detect visual pairwise differences that qualify as an error. User feedback is received, indicating that at least one assessed pairwise difference should not have qualified as an error. The prediction engine is then re-trained based on the user feedback.

20 Claims, 9 Drawing Sheets

(56) References Cited

U.S. PATENT DOCUMENTS

| | | | |
|---|---|---|---|
| 2011/0078663 A1* | 3/2011 | Huang et al. | 717/126 |
| 2011/0083076 A1* | 4/2011 | Kang | 715/735 |
| 2011/0093459 A1* | 4/2011 | Dong et al. | 707/725 |
| 2011/0093773 A1* | 4/2011 | Yee | 715/235 |
| 2011/0225289 A1* | 9/2011 | Prasad et al. | 709/224 |
| 2011/0289489 A1* | 11/2011 | Kumar et al. | 717/135 |
| 2012/0033863 A1* | 2/2012 | Wojton et al. | 382/128 |

OTHER PUBLICATIONS

U.S. Appl. No. 13/026,899, filed Feb. 14, 2011, Prasad.

* cited by examiner

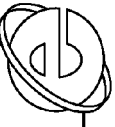
FIG. 1

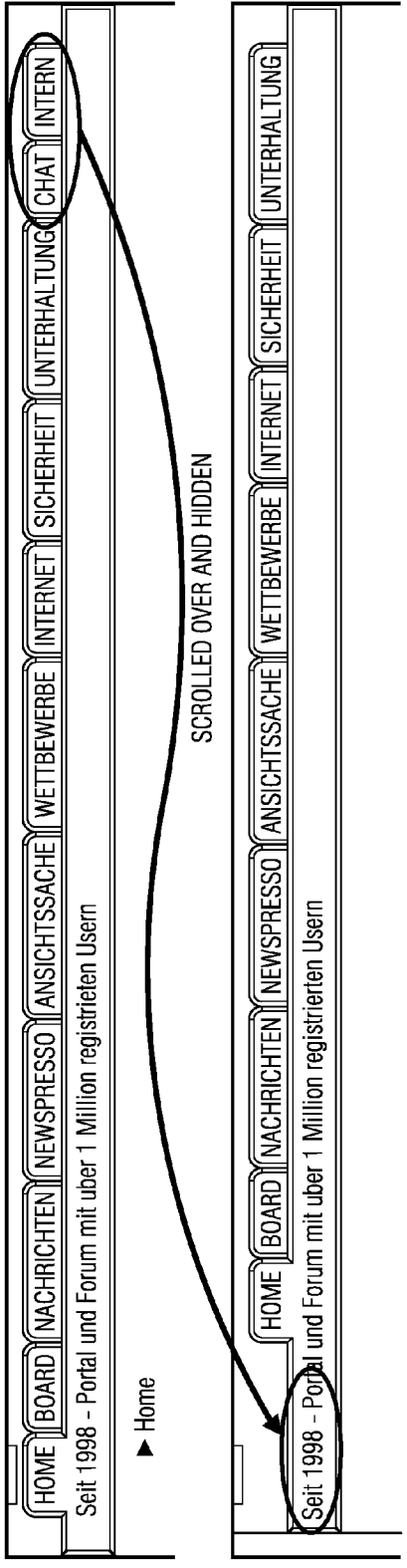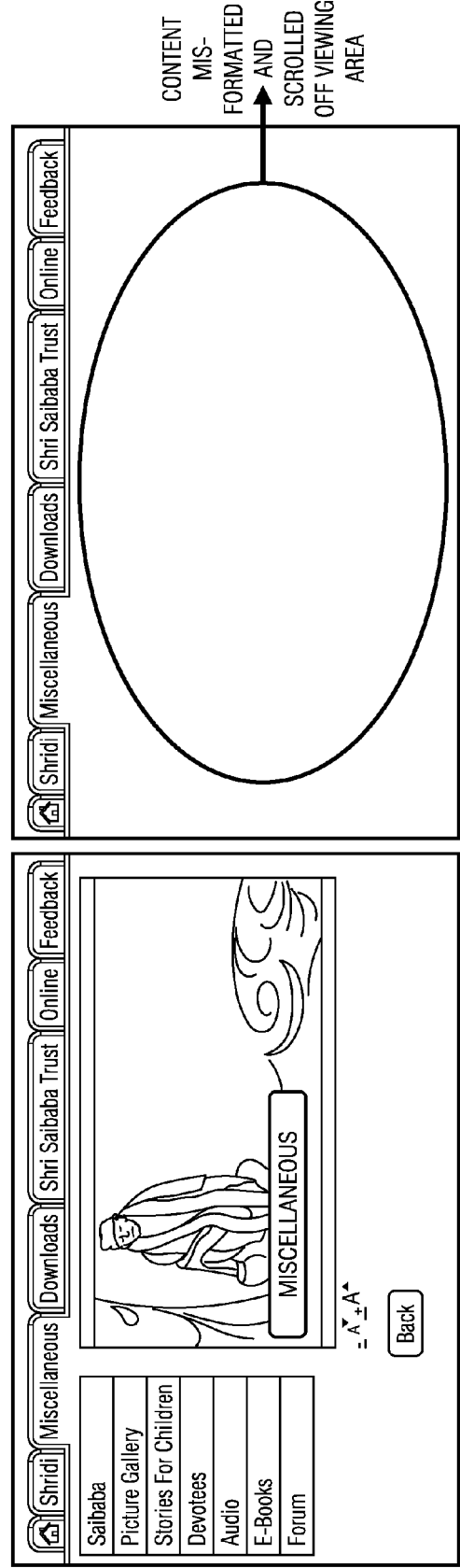
FIG. 5a

ERROR EXAMPLE 3: DIFFERENCES IN STYLE

Welcome to SPIDER contributor query system

Welcome to SPIDER contributor query system

ERROR EXAMPLE 4: DIFFERENCES IN SIZE

Font Size — Font Size [x][x]  MISSING CONTENT MANIFESTING AS DIFFERENCE IN SIZE

NON-ERROR EXAMPLE 1:

[Month ▾] [Month ▾]

STYLE DIFFERENCE

NON-ERROR EXAMPLE 2:

[Login][Register] [Login][Register]

STYLE AND SPACING DIFFERENCE

*FIG. 5b*

| FEATURE TYPE | | | IMAGE | | | | GEOMETRY | | DOM/BROWSER ENVIRONMENT | |
|---|---|---|---|---|---|---|---|---|---|---|
| ERROR CATEGORY | ERROR TYPE | EMD | COLOR DENSITY | COLOR DIFFERENCE RATIO | SIZE | SIZE DIFFERENCE RATIO | DISPLACEMENT RATIO | HTML TAG | BROWSER(S) |
| POSITION | SIGNIFICANTLY MOVED | ✓ | | | | | | | |
| POSITION | MODERATE MOVEMENT | | ✓ | | | | ✓ | | |
| POSITION | HIDDEN | | | ✓ | | | ✓ | | |
| SIZE | MISSING | | | | | ✓ | | | |
| SIZE | MODERATE SIZE DIFFERENCE | ✓ | ✓ | | ✓ | ✓ | | | |
| STYLE | COLOR, FONT, ACCENT, SIZES, ETC. | ✓ | ✓ | ✓ | ✓ | ✓ | | ✓ | ✓ |
| OTHER | COMBINATION | ✓ | ✓ | | ✓ | | ✓ | ✓ | ✓ |
| NON-ERRORS | BROWSER SPECIFIC RENDERING | | ✓ | | ✓ | | | ✓ | ✓ |

*FIG. 6*

- Feature Computations
  - $c(c')$ : # colors in image #1 (#2)
  - $a = x * y$ : Size of image #1
    - (respectively $a'$ for Image #2)
  - Color difference Ratio (CDR)
    - CDR $= |c-c'| / \min(c, c')$
  - Size difference ratio (SDR)
    - SDR $= |a-a'| / \min(a, a')$
  - Visual Dispacement Ratio (VDR)
    - VDR $= \dfrac{\sqrt{(x_1-x_1')^2+(y_1-y_1')^2}}{\min(d, d')}$
  - Color Density (CD): # colors/100 sq. pixels
  - Earth Mover's Distance (EMD): As explained earlier

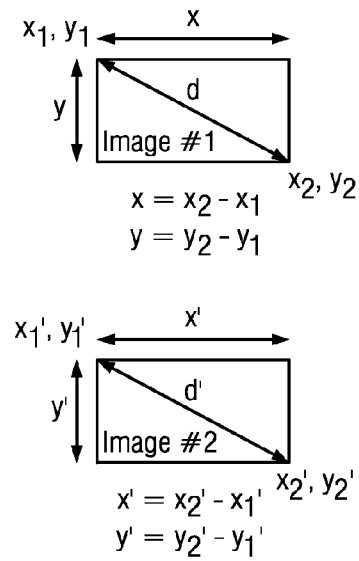

$x = x_2 - x_1$
$y = y_2 - y_1$ $x' = x_2' - x_1'$
$y' = y_2' - y_1'$

NOTE: Co-ordinates w.r.t. top left corner of browser viewing pane

*FIG. 7*

USING MACHINE LEARNING TO IMPROVE DETECTION OF VISUAL PAIRWISE DIFFERENCES BETWEEN BROWSERS

RELATED APPLICATIONS

This application hereby incorporates by reference in its entirety and for all purposes, U.S. patent application Ser. No. 13/248,027, filed on 29 Sep. 2011, entitled "Incremental Visual Comparison of Web Browser Screens", U.S. patent application Ser. No. 12/723,568, filed on 12 Mar. 2010, entitled "Determining Differences in an Event-Driven Application Accessed in Different Client-Tier Environments" and U.S. patent application Ser. No. 13/026,899, filed on 14 Feb. 2011, entitled "Web Service for Automated Cross-Browser Compatibility Checking of Web Applications.

INTRODUCTION

The present disclosure relates generally to determining differences in an event-driven application accessed in different client-tier environments.

A web application follows a typical client-server computing model and usually consists of several server and client side components. Server side components get invoked when the web server receives a request (typically, from a remote user through a web browser). As a result of the server side execution, various client side components are dynamically generated and sent back to the web browser in the form of HTML (HyperText Markup Language) pages. These pages, which are rendered by the browser, reference or contain resources such as images, animations, style information (e.g., Cascading Style Sheets (CCS)) and scripts (e.g., JavaScript or VBScript).

A web browser consists of different subsystems that handle various functionality, such as processing the client side components and managing the interactions of these components with system resources (e.g., network, display, file system). In some subsystems of a browser, one of the main components is the layout engine, which is responsible for rendering a web page by parsing the HTML tags in the page and applying to the relevant elements the style information contained in the CSS stylesheets for the page. The browser also maintains a DOM (Document Object Model) representation of the web page in its memory to allow scripts associated with the page to query and modify web page elements. Although there is a standard definition for the DOM format, web browsers often deviate from the standard. Moreover, since most web pages have browser-specific code to make them work on different browsers and platforms, the DOM generated by different browsers can be very different. For this reason, simply comparing the DOM information in different web browsers may not be ideal when comparing web pages rendered in such browsers.

A basic technique for comparing two images is to compare their histograms, where an image histogram represents the distribution of the value of a particular feature in the image. In particular, a color histogram of an image represents the distribution of colors in that image, that is, the number of pixels in the image whose color belongs in each of a fixed list of color ranges (bins). Obviously, if two images are the same, their color distributions will also match. Although the converse is not true, and two different images can have the same histogram, this issue is again not particularly relevant in our problem domain.

Basic histogram-matching techniques find the difference between corresponding bins across two images, which can result in false positives in the case of small shifts. The use of the Earth Movers' Distance (EMD) can alleviate this issue. EMD is a measure of the distance between two distributions and, intuitively, consists of the minimum amount of "work" required to make the two histograms identical by moving around the quantities in the different bins. Because it can ignore small changes in an image, EMD is widely used in computer vision. For the same reason, it is a suitable approach for the problem of comparing the graphical rendering across web browsers, where we want to be able to account for negligible variations while catching larger changes.

Event-driven applications typically may be accessed in different client-tier environments. However, in many cases, a first client-tier environment may provide a different end-user experience of the event-driven application than a second client-tier environment. These types of issues are far from rare because developers tend to use mostly one browser during development and then port the code to other browsers. Even in the case where multiple browsers are considered from the beginning, it is difficult to test for all possible browsers and versions. Moreover, such testing is performed in a mostly manual manner, and is thus extremely time consuming (and often neglected). In fact, cross-browser issues are notoriously considered to be a major problem by most web application developers.

Layout issues are very common in web applications and result in differences in rendering the web page across browsers that are visible to the user. These issues can be classified as differences in element position, size, visibility, or appearance. Differences in positions and size are self explanatory. Differences in visibility consist of an element not being visible in one or more browsers. Finally, we define as differences in appearance when the an element's style or content is different across browsers.

Functionality issues involve the functionality of a web application and are often due to differences in the way the script elements within a web page are executed by different browsers. Functionality issues typically limit the ability of a user to access specific web page elements, such as widgets. Although the users would identify the problem when they try to exercise the affected elements, these issues are sometimes more difficult to identify because they may not have any visible effect (e.g., a button may be displayed correctly even if it does not work).

Non-Compliant Browsers: Although the client side technologies have associated standards, they continue to evolve. At any point in time, there are thus features that are in the specification but are either not implemented or not implemented correctly in some browsers. These problematic features are often known, and there are web sites that maintain a list of such features to help web developers be aware of them and provide suitable workarounds in their code. The check performed at line 6 by the script.js script in FIG. 2 is a typical example of one such workaround.

Extra Features in Browsers: Many browsers implement extra features that are not a part of the standard to provide more flexibility to developers. While web developers try to avoid using these features as much as possible, they do use them for convenience. For example, Internet Explorer supports conditional comments—comments that allow the commented out code to conditionally run in Internet Explorer while being In order to ensure a high-quality user experience, cross-browser testing and regression testing is typically undertaken. However, the conventional manner of performing such testing, which involves a high number of visual comparisons, may be not only time-consuming, but also error-prone.

BRIEF DESCRIPTION OF THE DRAWINGS

FIG. 1 illustrates an example screen of an event-driven application, as executed within two different client-tier environments.

FIGS. 5a and 5b illustrate examples of typical errors that may appear in various client-tier environments for example event-driven applications.

FIG. 6 presents an example matrix describing types of errors and factors that may be used in error detection.

FIG. 7 describes example algorithms for computing factors listed in the matrix of FIG. 6.

DESCRIPTION OF EXAMPLE EMBODIMENTS

Embodiments disclosed herein provide methods for utilizing machine learning to improve visual comparison and error prediction when performing cross-browser testing and regression testing of event-driven applications. In some embodiments, diverse factors are analyzed to detect pairwise differences that qualify as meaningful errors.

FIG. 1 illustrates a comparison of two example screens displaying the end-user experience of a state of an event-driven application in two different client-tier environments: screen 110 displaying the screen as rendered by the Firefox® environment and screen 120 displaying the screen as rendered by the Internet Explorer® environment. Comparison of these two screens indicates four regions that may require visual comparison.

Figure 2:
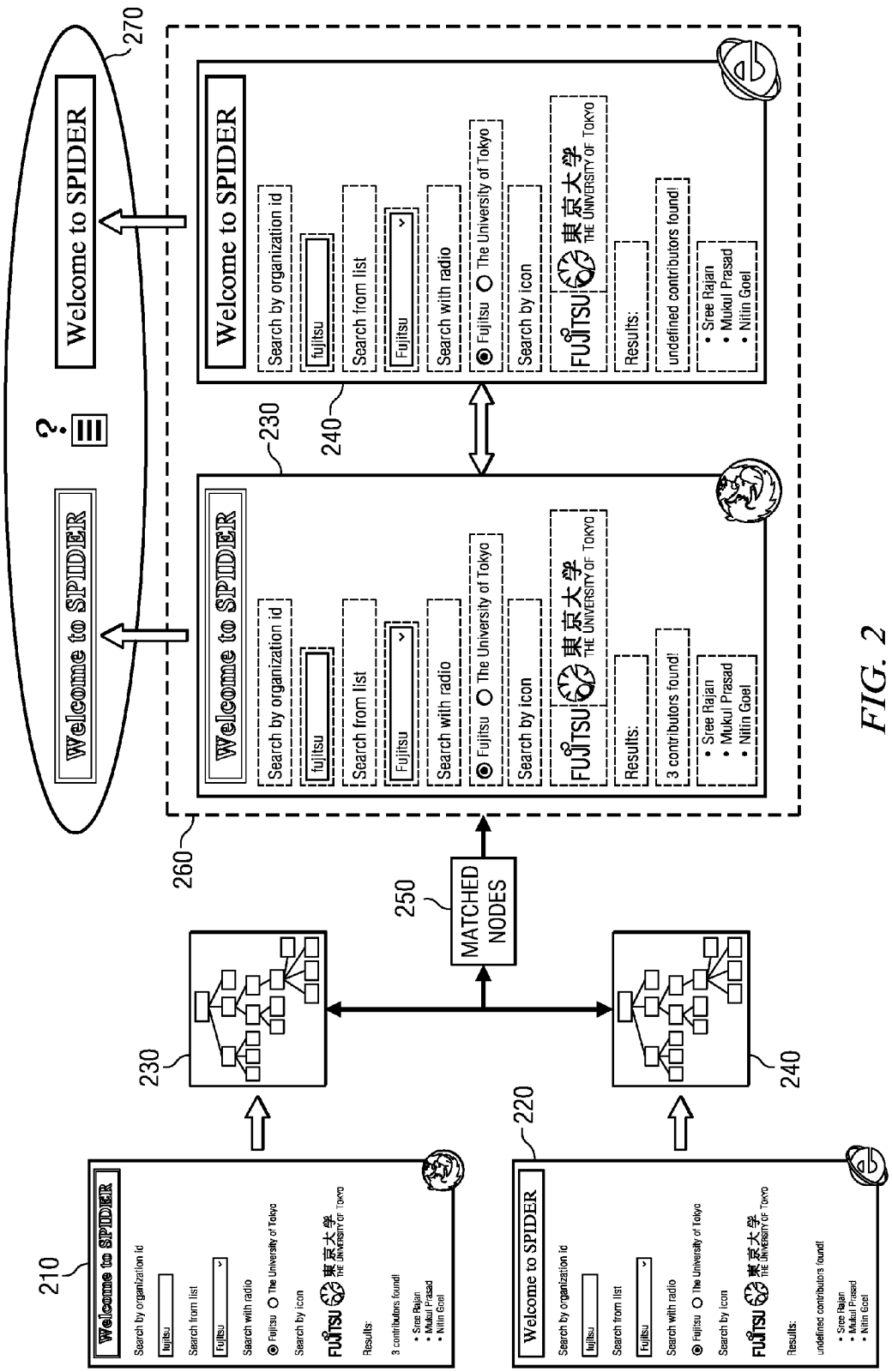
FIG. 2 illustrates an overview of a process for performing cross-browser testing and/or regression testing.

FIG. 2 illustrates an overview of a process for performing cross-browser testing and/or regression testing. Two example screens displaying the end-user experience of a state of an event-driven application in two different client-tier environments (the Firefox® environment 210 and the Internet Explorer® environment 220). From each end-user experience screen, a structured representation (230 and 240, respectively) of the screen is extracted. In some embodiments, a structured representation of a screen may comprise a Document Object Model (DOM) tree, each comprising a plurality of DOM nodes or elements. In some embodiments, each DOM node or element comprises an HTML tag.

From structured representations 230 and 240, a set of matched node pairs 250 is determined for the screen. The goal is to visually compare each pair of matched nodes. For example, when structured representations of screen 260 are compared as between the Firefox® environment 230 and the Internet Explorer® environment 240, each comparison operation 270 assesses the pair of nodes to determine whether the image in each node displays any pairwise differences.

Figure 3:
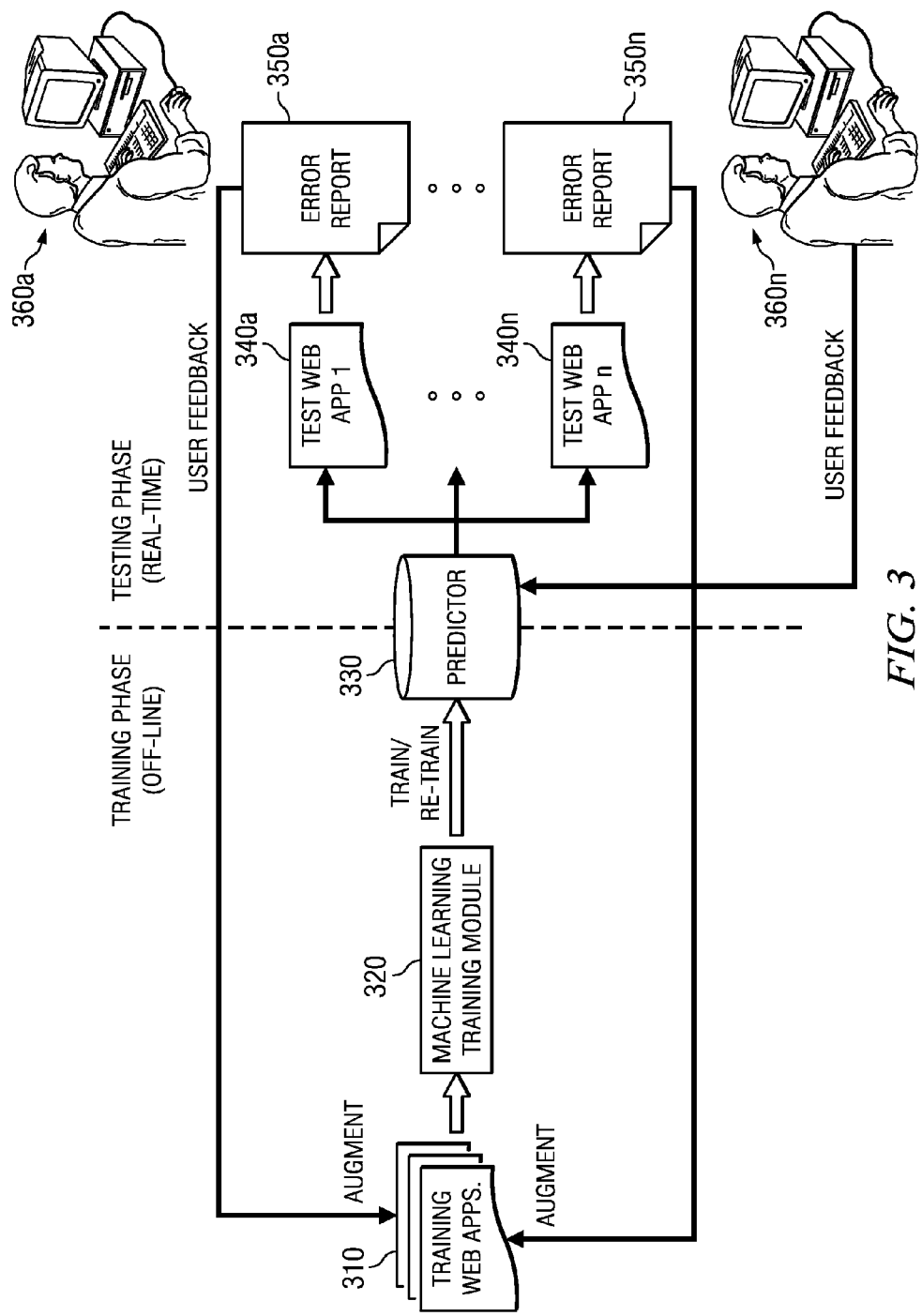
FIG. 3 illustrates an overview of one example embodiment incorporating machine learning to improve visual comparison and error prediction.

FIG. 3 illustrates an overview of one example embodiment incorporating machine learning to improve visual comparison and error prediction. In the initial Training Phase, images from screens from a number of training web applications 310 executed in a plurality of client-tier environments are compared and assessed to determine any pairwise differences between pairs of images, wherein each image pair represents at least a portion of the end-user experience screen in each of the client-tier environments. The machine learning training module 320 trains the prediction engine 330 based on the assessed pairwise differences.

In some embodiments, the prediction engine 330 learns to classify pairwise differences based on a decision tree classifier that incorporates algorithms to compute or assess a number of different features.

In the Testing Phase, the prediction engine 330 is then used to test web applications 340, from which error reports 350 are generated. Error reports 350 may contain some number of false-positive errors—user feedback 360 detecting the false-positive errors may then be applied to re-train prediction engine 330.

Figure 4:
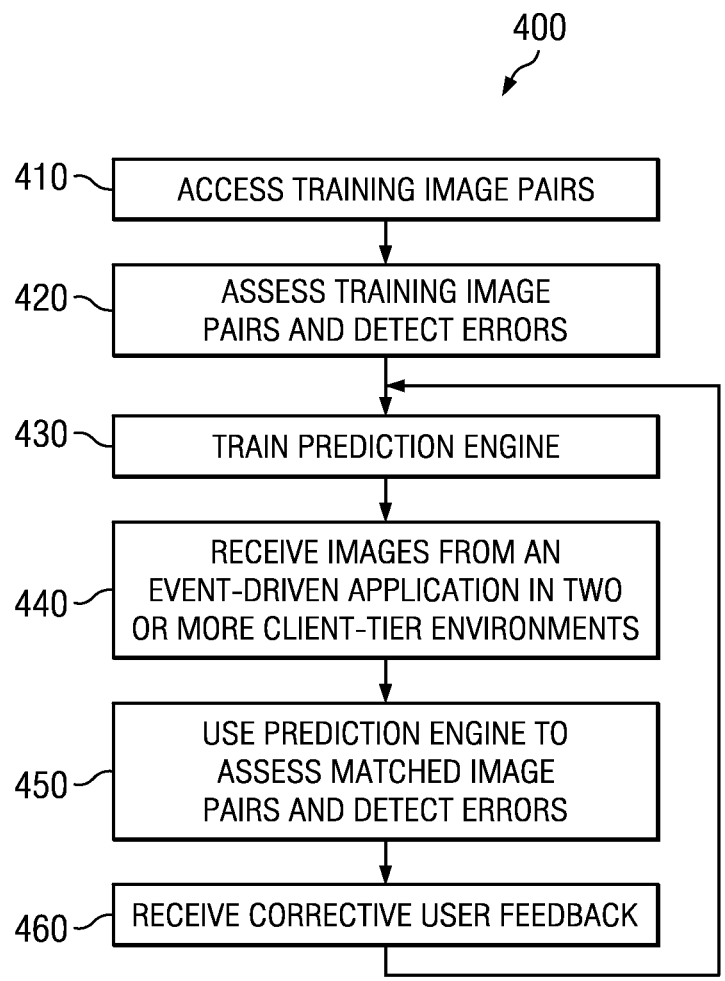
FIG. 4 illustrates an example method for utilizing machine learning to improve visual comparison and error prediction.

FIG. 4 illustrates an example method for utilizing machine learning to improve visual comparison and error prediction. The training phase begins with step 410—training image pairs are used to train the prediction engine. The training image pairs are assessed (step 420) the training image pairs by classifying pairwise differences between image pairs as qualified errors (or not). In step 430, the prediction engine learns from the assessed pairwise differences, using machine learning techniques and various classification algorithms. The testing phase then begins with step 440: images from end-user experience screens representing states of an event-driven application executed in multiple client-tier environments are received and matched into pairs. In step 450, the prediction engine is then used to assess the matched image pairs and detect errors. Upon inspection of the errors logs, users may submit feedback (step 460) to correct and re-train the prediction engine (step 430).

FIGS. 5a and 5b illustrate examples of typical errors that may appear in various client-tier environments for example event-driven applications. As shown in Error Example 1 of FIG. 5a, in some client-tier environments, images may be hidden due to the behavior of the event-driven application in that particular client-tier environment.

FIG. 6 presents an example matrix describing types of errors and factors that may be used in error detection. As shown in FIG. 6, there are three major categories of factors that may be assessed: Image, Geometry, and DOM/Browser Environment. Upon assessing various combinations of these factors, multiple categories of errors may be detected, including position, size, style, combinations thereof, etc. In addition, non-errors may also be affirmatively detected.

FIG. 7 describes example algorithms for computing factors listed in the matrix of FIG. 6.

Figure 8:
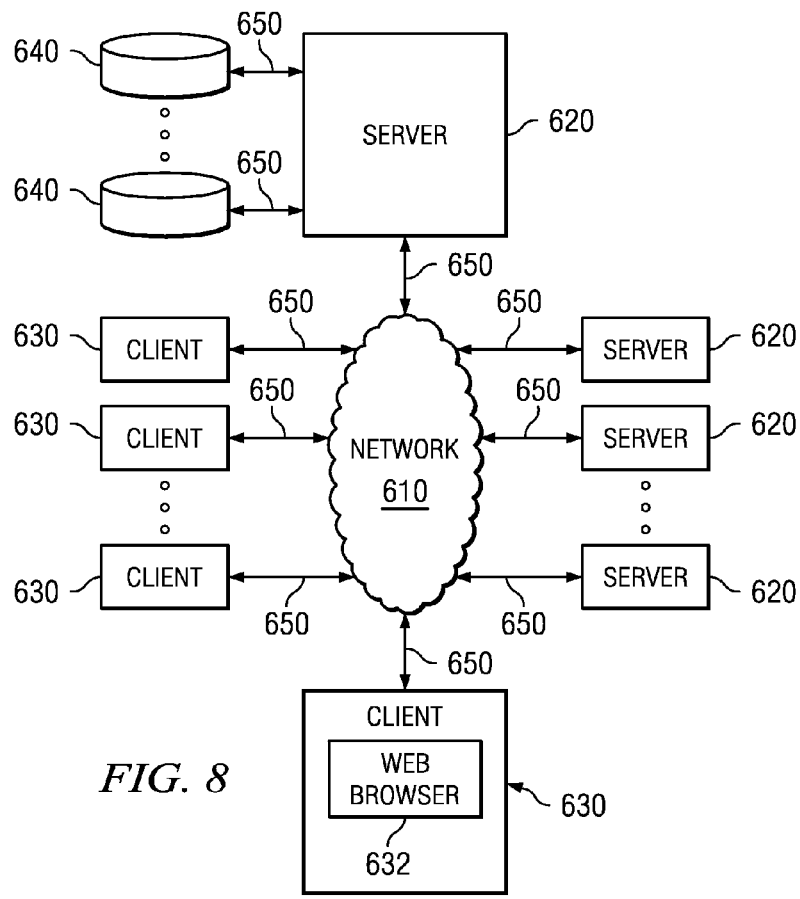
FIG. 8 illustrates an example system for embodiments disclosed herein.

Particular embodiments may be implemented in a network environment. FIG. 8 illustrates an example network environment 600 suitable for providing cross-browser compatibility checking as a web-based service. Network environment 600 includes a network 610 coupling one or more servers 620 and one or more clients 630 to each other. In particular embodiments, network 610 is an intranet, an extranet, a virtual private network (VPN), a local area network (LAN), a wireless LAN (WLAN), a wide area network (WAN), a metropolitan area network (MAN), a portion of the Internet, or another network 610 or a combination of two or more such networks 610. The present disclosure contemplates any suitable network 610.

One or more links 650 couple a server 620 or a client 630 to network 610. In particular embodiments, one or more links 650 each includes one or more wireline, wireless, or optical links 650. In particular embodiments, one or more links 650 each includes an intranet, an extranet, a VPN, a LAN, a WLAN, a WAN, a MAN, a portion of the Internet, or another link 650 or a combination of two or more such links 650. The present disclosure contemplates any suitable links 650 coupling servers 620 and clients 630 to network 610.

In particular embodiments, each server 620 may be a unitary server or may be a distributed server spanning multiple computers or multiple datacenters. Servers 620 may be of various types, such as, for example and without limitation, web server, news server, mail server, message server, advertising server, file server, application server, exchange server, database server, or proxy server. In particular embodiments, each server 620 may include hardware, software, or embedded logic components or a combination of two or more such components for carrying out the appropriate functionalities implemented or supported by server 620. For example, a web server is generally capable of hosting websites containing web pages or particular elements of web pages. More specifically, a web server may host HTML files or other file types, or may dynamically create or constitute files upon a request, and communicate them to clients 630 in response to HTTP or other requests from clients 630. A mail server is generally capable of providing electronic mail services to various clients 630. A database server is generally capable of providing an interface for managing data stored in one or more data stores.

In particular embodiments, one or more data storages 640 may be communicatively linked to one or more severs 620 via one or more links 650. In particular embodiments, data storages 640 may be used to store various types of information. In particular embodiments, the information stored in data storages 640 may be organized according to specific data structures. In particular embodiment, each data storage 640 may be a relational database. Particular embodiments may provide interfaces that enable servers 620 or clients 630 to manage, e.g., retrieve, modify, add, or delete, the information stored in data storage 640.

In particular embodiments, each client 630 may be an electronic device including hardware, software, or embedded logic components or a combination of two or more such components and capable of carrying out the appropriate functionalities implemented or supported by client 630. For example and without limitation, a client 630 may be a desktop computer system, a notebook computer system, a netbook computer system, a handheld electronic device, or a mobile telephone. The present disclosure contemplates any suitable clients 630. A client 630 may enable a network user at client 630 to access network 630. A client 630 may enable its user to communicate with other users at other clients 630.

A client 630 may have a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 630 may enter a Uniform Resource Locator (URL) or other address directing the web browser 632 to a server 620, and the web browser 632 may generate a Hyper Text Transfer Protocol (HTTP) request and communicate the HTTP request to server 620. Server 620 may accept the HTTP request and communicate to client 630 one or more Hyper Text Markup Language (HTML) files responsive to the HTTP request. Client 630 may render a web page based on the HTML files from server 620 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

In particular embodiments, the cross-browser compatibility checking service may reside and execute on a server 620. A user of the service may access the service through a web browser 632 executing on a client 630 associated with the user.

Figure 9:
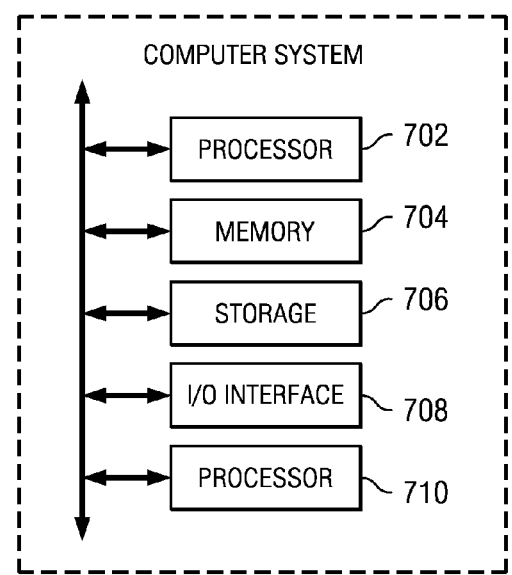
FIG. 9 illustrates a computer system for embodiments disclosed herein.

Particular embodiments may be implemented on one or more computer systems. FIG. 9 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. The present disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. The present disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more processors associated with one or more computer systems:

receiving information associated with a first plurality of matched image pairs;

assessing each matched image pair in the first plurality of matched image pairs to detect a first set of visual pairwise differences that qualify as an error, wherein a visual pairwise difference comprises a difference with respect to at least one of position, size, color, or style information from Cascading Style Sheets (CSS);

training, by one or more of the processors, a prediction engine based upon the first plurality of matched image pairs and the first set of visual pairwise differences using a machine learning training module, wherein the prediction engine learns to classify visual pairwise differences based on a decision tree classifier that incorporates one or more algorithms to compute one or more of the differences;

receiving information associated with a second plurality of matched image pairs, wherein each matched image pair in the second plurality of matched image pairs comprises at least a portion of a visual end-user experience screen of an event-driven application executed in a client-tier environment;

assessing, using the prediction engine, each matched image pair in the second plurality of matched image pairs to detect a second set of visual pairwise differences that qualify as an error;

receiving user feedback, for at least one matched image pair in the second plurality of matched image pairs that was assessed to have at least one visual pairwise difference from the second set of visual pairwise differences, that the assessed visual pairwise difference from the second set of visual pairwise differences should not have qualified as an error; and re-training, by one or more of the processors, the prediction engine based on the user feedback.

2. The method of claim 1, wherein one or more of the visual pairwise differences from the first set or second set of visual pairwise differences comprises a difference with respect to position, and wherein assessing an image pair to detect the visual pairwise difference comprises assessing, for each image in the image pair, information associated with at least one of: a displacement ratio, a size, a color difference ratio, a color density, or an Earth Movers' Distance (EMD).

3. The method of claim 1, wherein one or more of the visual pairwise differences from the first set or second set of visual pairwise differences comprises a difference with respect to size, and wherein assessing an image pair to detect the visual pairwise difference comprises assessing, for each image in the image pair, information associated with at least one of: a size difference ratio, a size, a color density, or an Earth Movers' Distance (EMD).

4. The method of claim 1, wherein one or more of the visual pairwise differences from the first set or second set of visual pairwise differences comprises a difference with respect to style, and wherein assessing an image pair to detect the visual pairwise difference comprises assessing, for each image in the image pair, information associated with at least one of: HyperText Markup Language (HTML) tags, a browser of the client-tier environment, a size, a color density, or an Earth Movers' Distance (EMD).

5. The method of claim 1, further comprising assessing, using the prediction engine, each image pair in the second plurality of image pairs to detect a third set of visual pairwise differences that do not qualify as an error, wherein a visual pairwise difference that does not qualify as an error comprises a difference that is related to browser-specific rendering of the event-driven application.

6. The method of claim 1, wherein the event-driven application is a web application.

7. The method of claim 1, wherein each client-tier environment comprises:
a particular web browser;
a version of the particular web browser;
a configuration of the particular web browser;
a particular operating system (OS) of a computer system that the particular web browser is running on; and
a screen resolution of a display of the computer system.

8. One or more computer-readable non-transitory storage media embodying software that is executed to:
receive information associated with a first plurality of matched image pairs;
assess each matched image pair in the first plurality of matched image pairs to detect a first set of visual pairwise differences that qualify as an error, wherein a visual pairwise difference comprises a difference with respect to at least one of position, size, color, or style information from Cascading Style Sheets (CSS);
train a prediction engine based upon the first plurality of matched image pairs and the first set of visual pairwise differences using a machine learning training module, wherein the prediction engine learns to classify visual pairwise differences based on a decision tree classifier that incorporates one or more algorithms computing one or more of the differences;
receive information associated with a second plurality of matched image pairs, wherein each matched image pair in the second plurality of matched image pairs comprises at least a portion of a visual end-user experience screen of an event-driven application executed in a client-tier environment;
assess, using the prediction engine, each matched image pair in the second plurality of matched image pairs to detect a second set of visual pairwise differences that qualify as an error;
receive user feedback, for at least one matched image pair in the second plurality of matched image pairs that was assessed to have at least one visual pairwise difference from the second set of visual pairwise differences, that the assessed visual pairwise difference from the second set of visual pairwise differences should not have qualified as an error; and
re-train the prediction engine based on the user feedback.

9. The media of claim 8, wherein one or more of the visual pairwise differences from the first set or second set of visual pairwise differences comprises a difference with respect to position, and wherein assessing an image pair to detect the visual pairwise difference comprises assessing, for each image in the image pair, information associated with at least one of: a displacement ratio, a size, a color difference ratio, a color density, or an Earth Movers' Distance (EMD).

10. The media of claim 8, wherein one or more of the visual pairwise differences from the first set or second set of visual pairwise differences comprises a difference with respect to size, and wherein assessing an image pair to detect the visual pairwise difference comprises assessing, for each image in the image pair, information associated with at least one of: a size difference ratio, a size, a color density, or an Earth Movers' Distance (EMD).

11. The media of claim 8, wherein one or more of the visual pairwise differences from the first set or second set of visual pairwise differences comprises a difference with respect to style, and wherein assessing an image pair to detect the visual pairwise difference comprises assessing, for each image in the image pair, information associated with at least one of: HyperText Markup Language (HTML) tags, a browser of the client-tier environment, a size, a color density, or an Earth Movers' Distance (EMD).

12. The media of claim 8, wherein the software is further operable when executed to assess, using the prediction engine, each image pair in the second plurality of image pairs to detect a third set of visual pairwise differences that do not qualify as an error, wherein a visual pairwise difference that does not qualify as an error comprises a difference that is related to browser-specific rendering of the event-driven application.

13. The media of claim 8, wherein the event-driven application is a web application.

14. The media of claim 8, wherein each client-tier environment comprises:
a particular web browser;
a version of the particular web browser;
a configuration of the particular web browser;
a particular operating system (OS) of a computer system that the particular web browser is running on; and
a screen resolution of a display of the computer system.

15. A system comprising: one or more processors;
and a memory coupled to the one or more processors comprising instructions executable by the one or more processors, the one or more processors executing the instructions to:
receive information associated with a first plurality of matched image pairs;
assess each matched image pair in the first plurality of matched image pairs to detect a first set of visual pairwise differences that qualify as an error, wherein a visual pairwise difference comprises a difference with respect to at least one of position, size, color, or style information from Cascading Style Sheets (CSS);

train a prediction engine based upon the first plurality of matched image pairs and the first set of visual pairwise differences using a machine learning training module, wherein the prediction engine learns to classify visual pairwise differences based on a decision tree classifier that incorporates one or more algorithms computing one or more of the differences;

receive information associated with a second plurality of matched image pairs, wherein each matched image pair in the second plurality of matched image pairs comprises at least a portion of a visual end-user experience screen of an event-driven application executed in a client-tier environment;

assess, using the prediction engine, each matched image pair in the second plurality of matched image pairs to detect a second set of visual pairwise differences that qualify as an error;

receive user feedback, for at least one matched image pair in the second plurality of matched image pairs that was assessed to have at least one visual pairwise difference from the second set of visual pairwise differences, that the assessed visual pairwise difference from the second set of visual pairwise differences should not have qualified as an error; and re-train the prediction engine based on the user feedback.

16. The system of claim 15, wherein one or more of the visual pairwise differences from the first set or second set of visual pairwise differences comprises a difference with respect to position, and wherein assessing an image pair to detect the visual pairwise difference comprises assessing, for each image in the image pair, information associated with at least one of: a displacement ratio, a size, a color difference ratio, a color density, or an Earth Movers' Distance (EMD).

17. The system of claim 15, wherein one or more of the visual pairwise differences from the first set or second set of visual pairwise differences comprises a difference with respect to size, and wherein assessing an image pair to detect the visual pairwise difference comprises assessing, for each image in the image pair, information associated with at least one of: a size difference ratio, a size, a color density, or an Earth Movers' Distance (EMD).

18. The system of claim 15, wherein one or more of the visual pairwise differences from the first set or second set of visual pairwise differences comprises a difference with respect to style, and wherein assessing an image pair to detect the visual pairwise difference comprises assessing, for each image in the image pair, information associated with at least one of: HyperText Markup Language (HTML) tags, a browser of the client-tier environment, a size, a color density, or an Earth Movers' Distance (EMD).

19. The system of claim 15, wherein the system is further operable when executing the instructions to assess, using the prediction engine, each image pair in the second plurality of image pairs to detect a third set of visual pairwise differences that do not qualify as an error, wherein a visual pairwise difference that does not qualify as an error comprises a difference that is related to browser-specific rendering of the event-driven application.

20. The system of claim 15, wherein the event-driven application is a web application.

* * * * *